United States Patent [19]

Iwaki

[11] Patent Number: 4,917,401

[45] Date of Patent: Apr. 17, 1990

[54] PARCEL CART

[75] Inventor: Osamu Iwaki, Nagoya, Japan

[73] Assignee: Kobayashi Hansokiki Co., Ltd., Nagoya, Japan

[21] Appl. No.: 230,341

[22] Filed: Aug. 9, 1988

[30] Foreign Application Priority Data

Dec. 25, 1987 [JP] Japan ............................ 62-198688[U]

[51] Int. Cl.⁴ .............................................. B62B 1/12
[52] U.S. Cl. ................................ 280/655; 280/47.29; D34/26
[58] Field of Search ................ D34/26; 280/655, 654, 280/652, 37, 47.29

[56] References Cited

U.S. PATENT DOCUMENTS

| D287,779 | 1/1987 | Slany | D34/26 |
| 3,043,603 | 7/1962 | Major, Sr. | 280/47.29 |
| 4,452,468 | 6/1984 | Eads et al. | 280/47.29 |
| 4,591,183 | 5/1986 | Gordon et al. | 280/655 |
| 4,679,817 | 7/1987 | Schufer | 280/655 |

Primary Examiner—David M. Mitchell
Attorney, Agent, or Firm—Lowe, Price, LeBlanc, Becker & Shur

[57] ABSTRACT

This invention relates to a parcel cart having improved portability. The cart of the invention can be folded extremely compactly and can be easily carried. When folded or when not in use, the cart is not bulky and does not require a large storage space so that it can be stored in a passenger car. The parcel cart includes releasable retaining means for releasably locking the parcel cart in the folded position.

1 Claim, 6 Drawing Sheets

PARCEL CART

BACKGROUND OF THE INVENTION

This invention relates to a parcel cart which can be folded compactly and is easy to carry around. More particularly, the present invention relates to a parcel cart comprising a bed main body having a rectangular box-like shape and equipped with a pair of wheels on both sides at its rear end portion, and parcel support portions formed on both sides of the bed main body in parallel with each other and having a predetermined width and a cavity formed at its center; a lower frame member having a size such that it can be stored in the cavity, and having the lower end thereof fitted pivotally to the rear edge portion of the bed main body; an upper frame member connected to the upper end on the back of the lower frame member by hinges; an upper slide member equipped with a handle formed at the upper end thereof; and a lower slide member connected to the lower end of the upper slide member through a flexible member; the upper and lower slide members being fitted slidably into the upper and lower frame members, respectively.

Conventional parcel carts equipped with wheels such as a handcart, have a handle which is disposed upright at the rear edge portion of a parcel bed when the carts are not used, the carts can be folded by turning this handle down forward. However, even though the handle can thus be turned down forward, the cart is yet bulky when it is not used, and requires a large storage space when it it put into a passenger car, for example.

SUMMARY OF THE INVENTION

It is therefore an object of the present invention to provide a parcel cart having improved portability which eliminates the problems with the prior art devices described above and which can be folded compactly.

The object of the invention described above can be accomplished by a parcel cart which comprises a bed main body having a rectangular box-like shape and equipped with a pair of wheels on both sides at the rear edge portion thereof, parcel support portions having a predetermined width and being in parallel with each other on both side edges thereof and a cavity at the center thereof; a lower frame member having a size such that it can be stored in the cavity, and having the lower end thereof fitted pivotally to the rear edge portion of the bed main body; an upper frame member connected to the upper end on the back of the lower frame member by hinges; an upper slide member equipped with a handle formed at the upper end thereof; and a lower slide member connected to the lower end of the upper slide member through a flexible member; the upper and lower slide members being fitted slidably into the upper and lower frame members, respectively.

When the upper and lower slide members are slid by gripping the handle and the flexible member is located at the position of the hinge, the upper frame member can be folded to the lower frame member and this lower frame member can be stored in the cavity by putting it down forward.

The upper and lower frame members can be kept under the linear state and the cart can be used easily by erecting the lower frame member, expanding the upper frame member and then sliding the upper and lower slide members so as to displace the flexible member away from the position of the hinge.

The above and other objects and novel features of the present invention will become more apparent from the following description when taken in connection with the accompanying drawings.

DESCRIPTION OF THE PREFERRED EMBODIMENT

Figure 1:
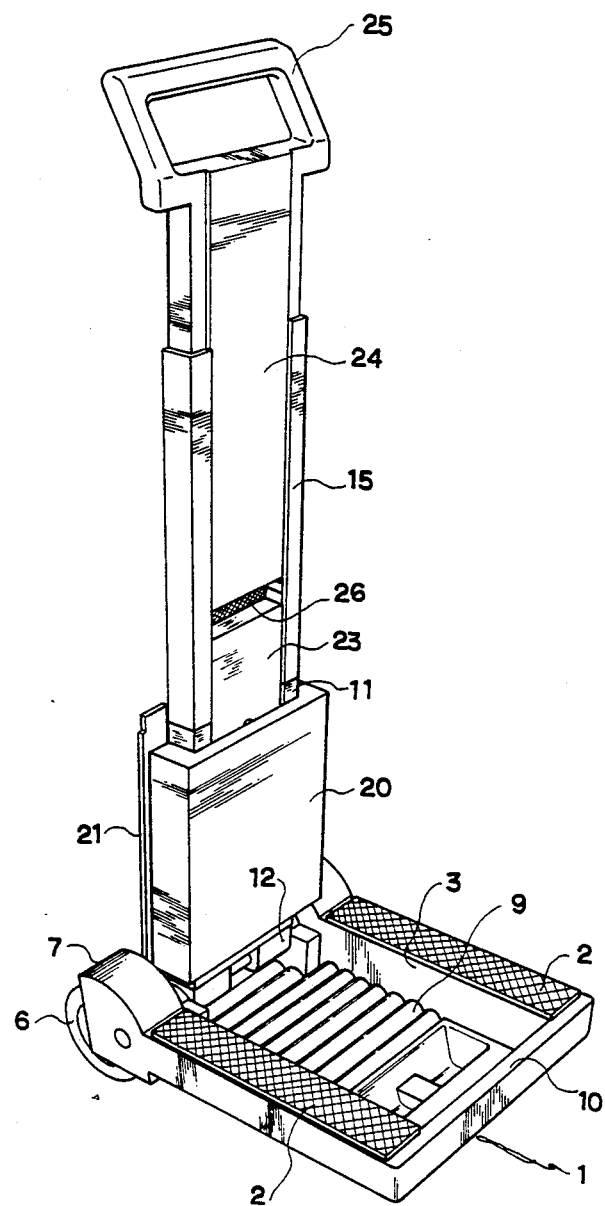
FIG. 1 is a perspective view showing a parcel cart in use in accordance with an embodiment of the present invention.

Hereinafter, one preferred embodiment of the present invention will be described in detail with reference to the accompanying drawings.

In the drawings, reference numeral 1 represents a bed main body made of a plastic material and having a box-like shape. Horizontal parcel support portions 2, 2 having a predetermined width are formed by fixing rectangular doubling plates to both side edges of the upper surface of the bed main body 1. A cavity 3 is defined between these parcel support portions 2, 2. An axle 5 is inserted horizontally through a bank portion 4 at the rear edge of the bed main body 1 and wheels 6, 6 are fitted rotatably to both ends of the axle 5. Wheel covers 7, 7 are formed at the rear end portions of the parcel support portions 2, 2, respectively. A diagonal grid-like corrugation is formed on the upper surface of the doubling plate forming each parcel support portion 2 as an anti-skid and buffer member. A support leg 8 is formed integrally with part of the cavity 3 near its front end in such a manner as to project downward. The portion 9 of the cavity at the rear of the support leg 8 is corrugated in order to improve mechanical strength. An inward plate 10 is formed integrally with the upper front edge of the bed main body 1 so as to extend inward.

Reference numeral 11 represents a lower frame member made of aluminum. The lower frame member 11 has a width such that it can be stored in the cavity 3, while its front side surface is open and has a flat prismatic shape having a uniform section. A connecting member 12 made of a plastic material is fitted into the opening at the lower end of the lower frame member 11. A support shaft 13 is disposed near the rear end of the cavity 3 of the bed main body 1 in parallel with the wheels 5. Since this support shaft is inserted through the connecting member 12, the lower frame member 11 can be turned up and down forwardly. A stopper 14 is formed integrally with the connecting member 12 in such a manner as to project from its back so that when the lower frame member 11 is erected, the stopper 14 comes into contact onto the bank portion 4 at the rear edge of the bed main body 1 and prevents the lower frame member 11 from inclining further rearward.

Reference member 15 represents an upper frame member made of aluminum. Its front side surface is open and has a flat prismatic shape having a uniform section in the same way as the lower frame member 11. However, the upper frame member 15 is somewhat longer than the lower frame member 11, and is connected to the upper end of the lower frame member 11 in such a manner as to be capable of bending rearward by fixing one of the sides of a hinge 17 to the back of the upper end of the lower frame member 11 by screws 17, 16, . . . and the other side of the hinge 16 to the back of the lower end of the upper frame member 15 by screws 18, 18, . . . , . A pin 19 projecting towards the front surface of the lower frame member 11 is formed integrally with a fitting portion of the connecting member 12 into the lower frame member 11 and a plastic front doubling plate 20 is engaged with this pin 19 so as to cover the front and both side surfaces of the lower frame member 11. A plastic back plate 21 is put on the back of the lower frame member 11 and is fixed mutually with the front doubling plate 20 by screws 22, 22 so that they are together fixed to the lower frame member 11. A plastic lower slide member 23 is disposed inside the lower frame member 11 slidably in the longitudinal direction of the lower frame member 11 while an upper slide member 24 is disposed inside the upper frame member 15 slidably in its longitudinal direction.

A handle 25 is formed integrally with the upper end of the upper slide member 24. The lower and upper slide members 23 and 24 are connected to each other through a flexible member 26. This flexible member 26 is made of a thick woven fabric having substantially the same width as the hinge 17. One of the ends of the flexible member 26 is fixed to the upper part of the lower slide member 23 by a stud 27 and screws 28, 28 . . . while the other end is fixed to the lower part of the upper slide member 24 by a stud 29 and screws 30, 30 . . . , . Projections 31, 31 are formed to extend on both side edges at the upper end of the lower slide member 23. A cup-shaped engagement button 32 is disposed near the lower part of the upper slide member 24 and is biased towards the back by a coil spring 33. A mouth piece 34, with which the engagement button 32 described above can engage, is fixed at the position which is substantially the intermediate point of height of the upper frame member 15. Besides a round hole to which the mouth piece 34 is fitted, a rectangular hole 35 through which the stopper 14 can pass and a rectangular engagement hole 36 with which a hook 37 can engage are bored on the upper frame member 15. The hook 37 is made of a soft elastic plastic, fitted to the rear edge portion of the bed main body 1 and urged rearward by a coil spring 39 stored in a cylinder portion 38 so that a hook portion 40 at its upper end engages with the engagement hole 36 described above.

Figure 2:
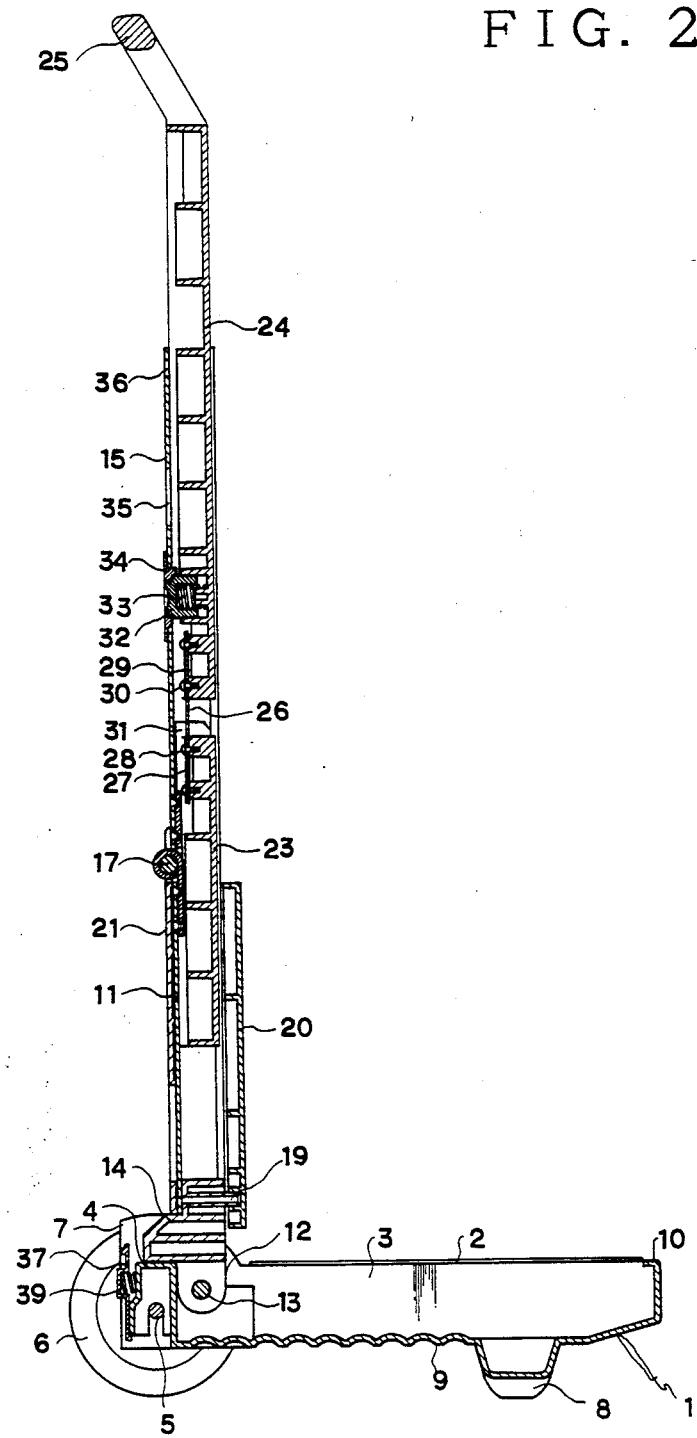
FIG. 2 is a longitudinal sectional view of FIG. 1.

The parcel cart having the construction described above is used in the following way. First of all, the lower frame member 11 is erected on the bed main body 1 and the upper frame member 15 is erected linearly on the lower frame member 11. Under this state, the handle 25 is pulled up and the upper slide member 24 is slid upward inside the upper frame member 15. In this instance, the lower slide member 23 connected by the flexible member 26 is pulled up, too, and substantially its upper half is pulled into the upper frame member 15. In other words, the lower slide member 23 is located to the position of the hinge 17 as shown in FIG. 2. In this case, the engagement button 32 meshes with the mouth piece 34 and projects therefrom to the back of the upper frame member 15. Accordingly, since the lower slide member 23 is fixed to the position of the hinge 17, the upper frame member 15 is locked in the linear state where it cannot be bent relative to the lower frame member 11.

A parcel is put on the parcel support portions 2, 2 and the bed main body 1 is inclined rearward by gripping the handle 25 with the wheels 6, 6 being the support points so that the support leg 8 is displaced from the floor and under this state, the wheels 6, 6 are rolled on the floor and the parcel can be carried to a desired place using limited force.

Figure 3:
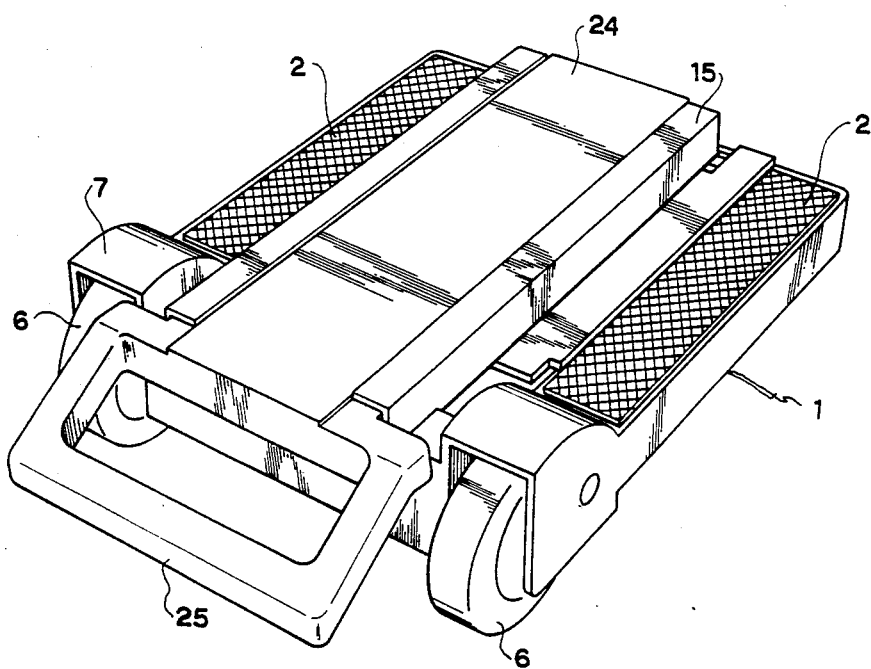
FIG. 3 is a perspective view of the parcel cart when folded.
Figure 4:
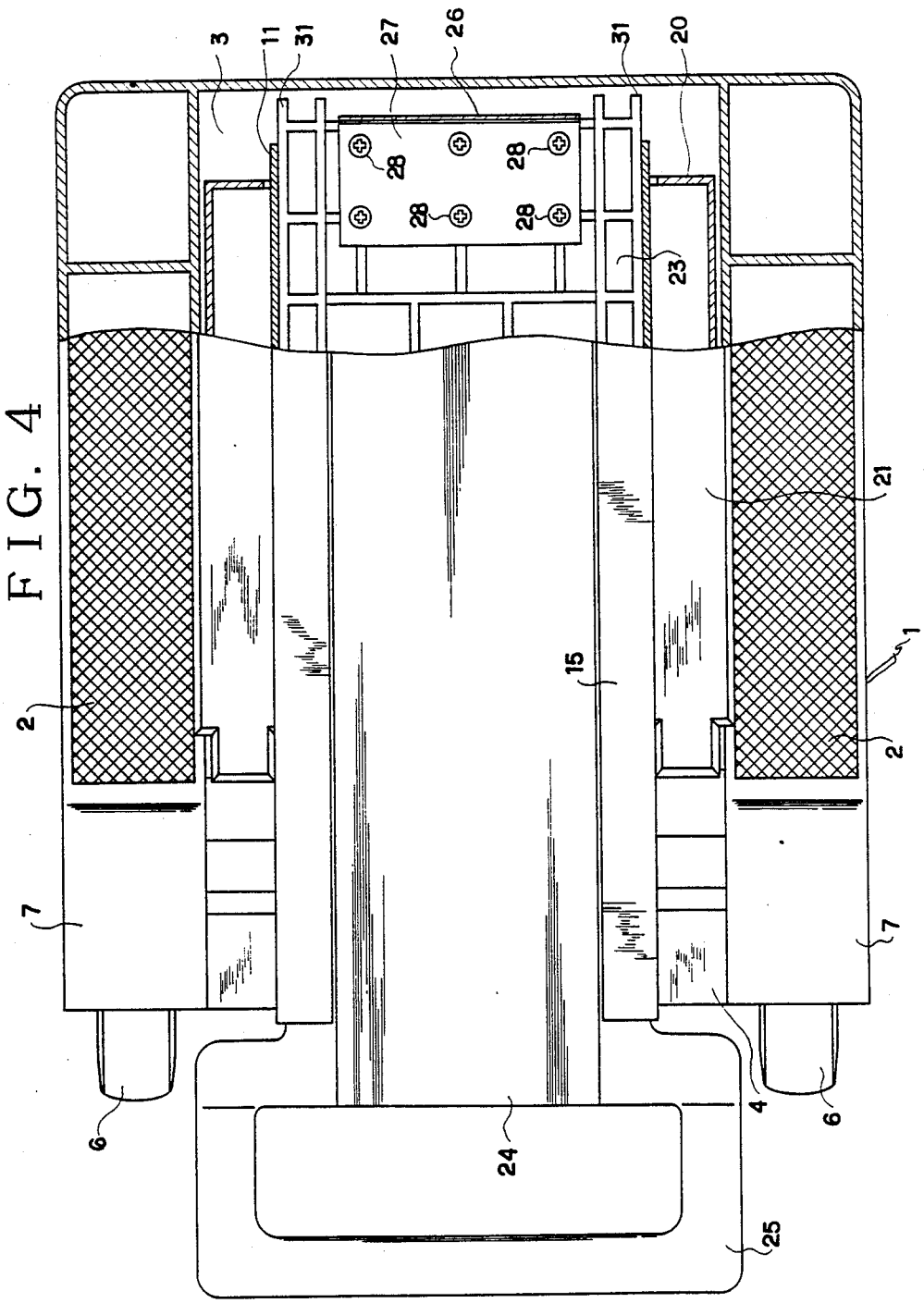
FIG. 4 is a partial sectional plan view of FIG. 4.
Figure 5:
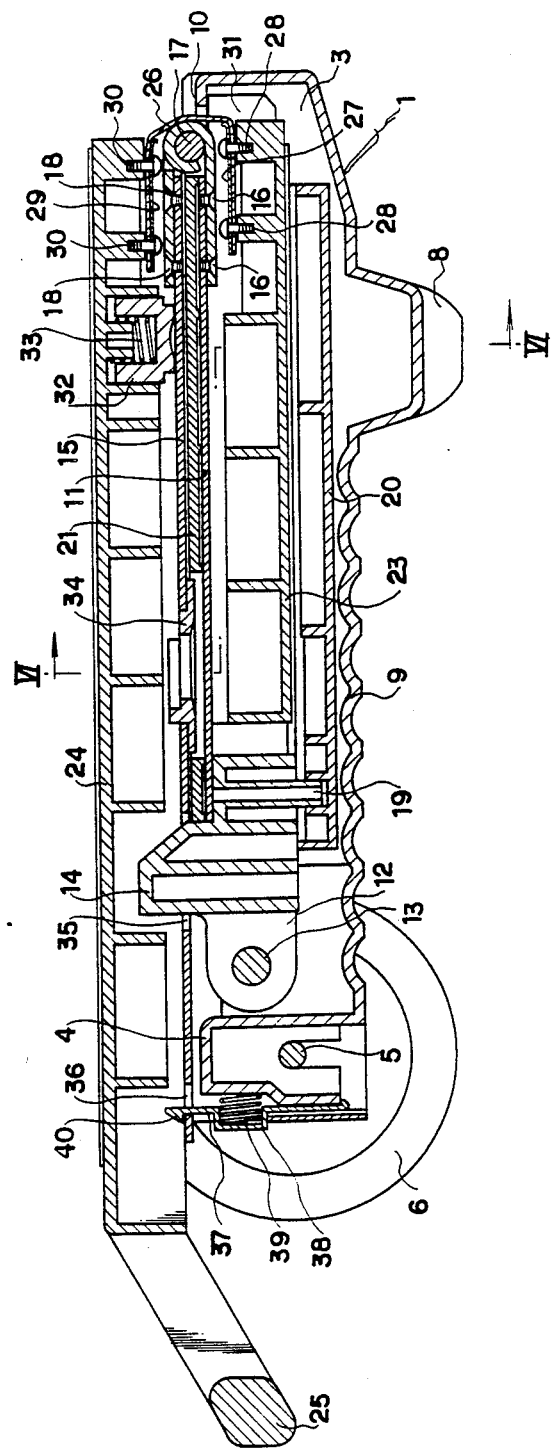
FIG. 5 is a longitudinal sectional view of FIG. 4.
Figure 6:
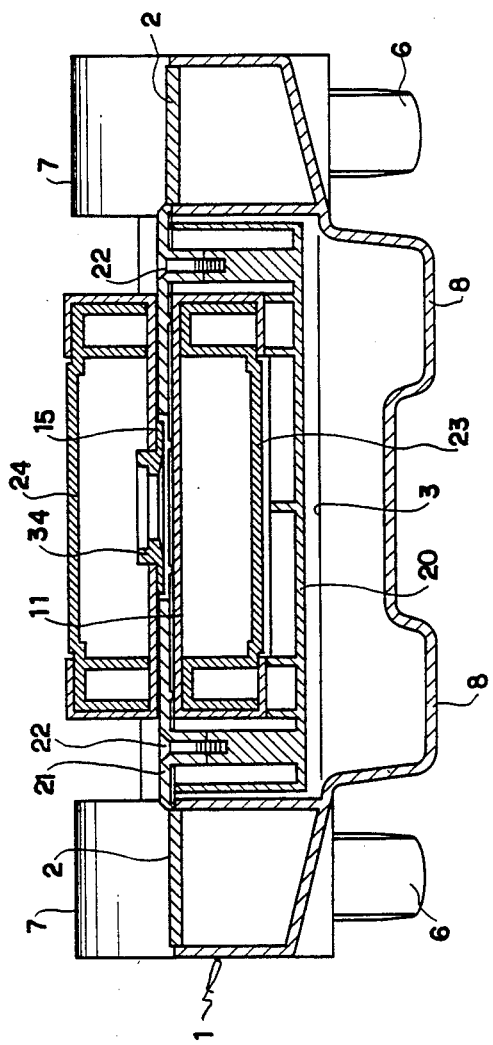
FIG. 6 is a sectional view taken along line VI–VI of FIG. 5.

To fold the parcel cart, the engagement button 32 is first pushed so as to store it in the upper frame member 15 and the handle 25 is pushed down so as to slide downward both the upper and lower slide members 24 and 23 and to locate the flexible member 26 at the position of the hinge 17. Then, the upper frame member 15 can be bent rearward by the hinge 17. In this instance, the lower frame member 11 is turned down forward with the support shaft 13 being the support point and is stored in the cavity 3. The upper frame member 15 is folded on the back of the lower frame member 11. At this time, the flexible member 26 covers the outer peripheral surface of the cylindrical portion of the hinge 17 as shown in FIG. 5 so that the flexible member 26 is somewhat stretched and pulls somewhat the lower slide member 23. In other words, the lower slide member 24 moves a little rightward in FIG. 5. Therefore, the projections 31, 31 of the lower slide member 23 overlap with the lower part of the inward plate 10. The hook portion 40 of the hook 37 meshes with the engagement hole 36 so that the upper frame member 15 is fixed while folded with the lower frame member 11. Accordingly, it is possible to easily handle and carry the parcel cart thus folded compactly by gripping its handle 25 as shown in FIG. 3. To use the parcel cart, the hook 37 is pushed down against the force of the coil spring 39 to disengage the hook portion 40 from the engagement hole 36. Then, the lower and upper frame members 11, 15 are erected and the parcel cart can be used easily.

In the parcel cart in accordance with the present invention described above, the lower frame member is stored in the cavity of the bed main body and the upper frame member is folded on the back of the lower frame member so that the cart can be folded extremely compactly. The cart is not bulky but can be carried around and used easily and conveniently.

Although the present invention has thus been described with reference to one preferred form thereof, it would be obvious to those skilled in the art that various changes and modifications can be made without departing from the scope and spirit thereof.

What is claimed is:

1. A parcel cart convertible between a folded storage position and an unfolded operating position, comprising:
   a main bed body having a rectangular box shape and provided with a pair of wheels on both sides of the rear edge portion thereof, respectively, parcel support portions, each having a predetermined width and being parallel to the other, on both side edges thereof, respectively, a cavity at the center thereof, and a flange portion which extends inwardly from the upper front edge thereof;
   a lower frame member having a size such that it can be stored in said cavity when the parcel cart is in the folded storage position, the lower end thereof being pivotally connected with the rear edge portion of said main bed body;

an upper frame member connected with the back of the end of said lower frame member by a hinge;

an upper slide member provided with a handle formed at the upper end thereof and a lower slide member connected to the lower end of said upper slide member by a flexible member, said upper and lower slide members being fitted slidably into said upper and lower frame members, respectively; and releasable retaining means for releasably retaining the parcel cart in the folded storage position, the releasable retaining means including a spring biased hook provided on said main bed body and an aperture formed in said upper frame member, said hook being spring biased in a locking position in said aperture when the parcel cart is in the folded storage position, and the releasable retaining means further including projections extending from said lower slide member and adapted to engage the flange portion which extends inwardly from the upper front edge of the main bed body to retain the lower frame member and the lower slide member within said cavity when the parcel cart is in the folded storage position.

* * * * *